United States Patent Office 3,634,434
Patented Jan. 11, 1972

3,634,434
3- OR 4-DICHLOROMETHYLENE-PIPERIDINES
Stephen I. Sallay, Wynnewood, and Scott J. Childress, Philadelphia, Pa., assignors to American Home Products Corporation, New York, N.Y.
No Drawing. Original application May 24, 1967, Ser. No. 640,849, now Patent No. 3,470,187. Divided and this application May 9, 1969, Ser. No. 839,122
Int. Cl. C07d 29/14
U.S. Cl. 260—293.51       3 Claims

ABSTRACT OF THE DISCLOSURE

Piperidine and tropane derivatives having an olefinic component in the 3 or 4-position of the ring have been prepared, the compounds demonstrating a central nervous system stimulating action.

The present application is a division of application Ser. No. 640,849, filed May 24, 1967 now U.S. Pat. 3,470,187.

BACKGROUND OF THE INVENTION

The invention pertains to a class of nitrogen-containing heterocyclic compounds more particularly piperidine and tropane derivatives having pharmacological activity.

The prior art discloses numerous piperidine derivatives mainly having pharmodynamic activity in the field of analgesis. The art also teaches the preparation of a number of tropane derivatives characterized by the typical action of these substances, essentially parasympatholytic in nature.

The state of the art known to the applicants may be represented by the following patents identified by U.S. Pat. Nos. 2,739,969; 2,800,479; 2,947,753; 3,056,795; and 3,056,796.

SUMMARY

The invention relates to the preparation of novel piperidine derivatives and closely related nortropane compounds with the object of finding compounds possessing valuable pharmacological properties.

Unexpected pharmacological action was found in a group of 3 or 4-substituted piperidine and nortropine compounds in which the substituent was an olefinic radical. The compounds showed activity as central nervous system stimulants and are therefore useful in the field of experimental and comparative pharmacology. In addition to the anti-depressant action, some anti-inflammatory an danalgesic action was also noted.

DESCRIPTION OF THE INVENTION

The compounds of the invention are illustrated by the following structural embodiment:

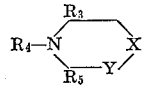

In the above structure, X and Y are intended to represent either $>CH_2$ or the symbol $>C=CR_1R_2$ but both are dissimilar in that when X is one symbol, Y is the other. The radical $=CR_1R_2$ is intended to represent either a di-halo methylene radical or a lower alkyl ester radical. The radical $R_4$ is intended to represent either a lower alkyl, preferably methyl or a phenyl(lower)alkyl, preferably phenethyl, while the radicals $R_3$ and $R_5$ represent either hydrogen or when taken together represent a divalent ethylene bridge between the ring carbons adjacent to the nitrogen atom to form a tropane configuration or bicyclic structure.

Compounds of the piperidine type, namely, where $R_3$ and $R_5$ in the above formula are hydrogen and having a dihalogen methylene radical, are prepared by first reacting a trihalomethane with triphenylphosphine and potassium t-butoxide in a hydrocarbon solvent, preferably heptane. The reaction product is concentrated by heating and is then reacted with N-substituted-3 or 4-piperidone to form the corresponding n-substituted-dihalo-methylene piperidine. Instead of carrying out the final reaction step with a 3 or 4-piperidone, it is contemplated to carry out the reaction with an N-substituted-nortropane-3-one in which case the final product is an N-substituted-3 dihalomethylenenortropane.

In order to prepare compounds of the invention having an acetic acid alkyl ester radical in the 3 or 4-position of the piperidine or nortropane ring, a tri(lower)alkyl phosphonoacetate, but preferably triethylphosphonoacetate, is reacted within sodium hydride in a solvent, preferably ethyleneglycol dimethylether (monoglyme). The reaction is kept below about 30° C. After action is completed, the mixture is reacted with the selected piperidone or nortropanone at about room temperature and the desired product is separated.

The compounds of the invention are useful either as the free bases or as either acid-addition salts or quaternary ammonium compounds.

The salts are formed by reacting the bases in known manner with organic or inorganic acids capable of forming pharmaceutically acceptable acid-addition salts. Suggested acids are, for example, acetic, citric, tartaric, maleic, or oxalic acids, among usual acids used to form non-toxic acid-addition salts. Inorganic acids are also contemplated and among these the hydrohalides, for example hydrochloride or bromide, sulfuric or phosphoric acids are useful for this purpose.

As indicated, quaternary ammonium salts may be formed in known manner from the bases described, using for example, a lower alkyl halide reactant, preferably methyl chloride, bromide or iodide. These also form salts that are non-toxic in the dosage range contemplated.

The compounds are used directly but more preferably in composition form at a dosage range of 10 to 150 mg./kg. Within this range the pharmacological action and medicinal utility as central nervous system stimulants is clearly demonstrated.

Medically useful compositions may be preferred for oral or parenteral use, containing a compound of the invention either alone or with other similarly active substances. Oral compositions may be in the form of tablets or capsules, or in liquid form with an aqueous carrier. In preparing tablets or capsules conventional and well known carriers or excipients are used such as lactose. starch, talc or calcium carbonate, together with usual tabletting materials such as magnesium stearate. Oral liquid forms may contain solid suspending agents particularly if sparingly soluble active ingredients are used. Parenteral compositions in aqueous form may also be prepared by combining soluble salts of the active substances in an aqueous medium.

The following examples are given for illustrative purposes in teaching how to carry out the inventive concept. It is to be understood that the temperatures are in degrees centigrade.

Example 1

Chloroform (12.0 g.) in 200 ml. of n-heptane was added over 30 minutes to a stirred, ice-cooled mixture of triphenylphosphine (26.2 g.) and potassium-t-butoxide (11.5 g.) in 250 ml. of heptane. The yellow colored suspension was concentrated to about 100 ml. at 15–20°. Then N-methyl-4-piperidone (11.3 g.) in 100 ml. heptane was added within 15 minutes. The mixture was heated to 40–50° for ½ hour and finally it was heated to 70° and allowed to stand over-night at room temperature. The reaction mixture was filtered and the filter cake was washed with 2× 100 ml. of heptane. The combined heptane solution was evaporated to dryness and the yellow oily residue was distilled at 46°/0.1 mm. The free base 4-dichloromethylene-1-methylpiperidine gave a maleate salt from ethanol-ether; M.P. 136–138°.

Example 2

The same reaction as Example 1 is carried out but using 25.3 g. of bromoform in place of the chloroform reactant. The product formed is the free base, dibromomethylene-1-methylpiperidine.

Example 3

Following the procedure of Example 1 but using N-benzyl-3-piperidone instead of N-methyl-4-piperidone, 1-benzyl-3-dichloromethylenepiperidine was obtained. The oxalate of 1-benzyl-3-dichloromethylenepiperidine was recrystallized from methanol-ether; M.P. 176–177°.

Example 4

Instead of using N-benzyl-3-piperidone as in Example 3 use N-phenethyl-3-piperidone and follow the process of Example 1, to produce the free base, 1-phenethyl-3-dichloromethylenepiperidine

Example 5

Following the procedure of Example 1, but using tropinone as an aminoketone, 3-dichloromethylene-8-methylnortropane was obtained and characterized as a citrate salt; M.P. 173.5–174.5° (from ethanol).

Example 6

Sodium hydride (0.05 mole) was covered with 20 ml. of monoglyme (distilled over LiAlH$_4$), and treated with triethylphosphonoacetate (0.057 mole) dissolved in 20 ml. of monoglyme. During the addition the temperature was kept below +30° C. After a few hours stirring at room temperature the reaction mixture was treated with tropinone (0.05 mole) in 30 ml. of monoglyme. The reaction mixture was set aside over-night at room temperature. The unreacted tropinone was separated by forming its oxime by hydroxylamine acetate in boiling methanol (1 hr. reflux). The reaction mixture was evaporated, dissolved in a minimum amount of chloroform and chromatographed on Al$_2$O$_3$ column. Chloroform eluated $\Delta^{3,\alpha}$-tropane acetic acid ethylester as a yellow oil which was transformed into the citrate salt; M.P. 114–115.5° (from acetone-ether).

In place of using triethylphosphonoacetate, an equivalent molar amount of trimethylphosphonoacetate may be used to form the $\Delta^{3,\alpha}$-tropane acetic acid methyl ester base. This, and various other obvious changes may be made in carrying out the invention without departing from the spirit or scope thereof.

The invention being claimed is:

1. A compound of the group consisting of a base having the formula:

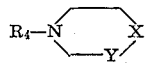

wherein X and Y are dissimilar and are selected from the group consisting of

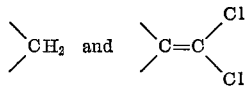

in which R$_4$ represents a member of the group consisting of lower alkyl and phenyl (lower) alkyl; and the pharmaceutically acceptable acid-addition salts thereof.

2. As a compound of claim 1, 4-dichloromethylene-1-methylpiperidine.

3. As a compound of claim 1, 1-benzyl-3-dichloromethylenepiperidine.

References Cited

UNITED STATES PATENTS 2,891,064   6/1959   Kundiger et al. _____ 260–293

OTHER REFERENCES

Ferles et al.: Collection Czech. Chem. Commun. 32 (4), 1631–6 (1967); [C.A. 67:54003e supplied, original unavailable].

HENRY R. JILES, Primary Examiner

G. T. TODD, Assistant Examiner

U.S. Cl. X.R.

260—293.72; 424—267